United States Patent [19]
Millier et al.

[11] Patent Number: 5,899,995
[45] Date of Patent: May 4, 1999

[54] METHOD AND APPARATUS FOR AUTOMATICALLY ORGANIZING INFORMATION

[75] Inventors: Marshall A. Millier, Hillsboro; Milind S. Pandit; John David Miller, both of Beaverton, all of Oreg.

[73] Assignee: Intel Corporation, Santa Clara, Calif.

[21] Appl. No.: 08/884,755

[22] Filed: Jun. 30, 1997

[51] Int. Cl.[6] .................................................. G06F 17/30
[52] U.S. Cl. ............................. 707/102; 707/104; 707/6
[58] Field of Search ............................ 707/2, 6, 10, 102, 707/104, 501

[56] References Cited

U.S. PATENT DOCUMENTS

| | | | |
|---|---|---|---|
| 5,717,914 | 2/1998 | Husick et al. | 707/5 |
| 5,754,939 | 5/1998 | Herz et al. | 455/4.2 |
| 5,761,662 | 6/1998 | Dasan | 707/10 |
| 5,784,608 | 7/1998 | Meske et al. | 707/2 |

*Primary Examiner*—Thomas G. Black
*Assistant Examiner*—John C. Loomis
*Attorney, Agent, or Firm*—Blakely, Sokoloff, Taylor & Zafman

[57] ABSTRACT

The present invention discloses an electronic filing system for automatically organizing information into a number of storage elements or folders. The storage elements are folders arranged hierarchically. The information is stored into the storage elements based on its contents. Each storage element is associated by a set of profiles and a set of constraint expressions. The constraint expressions are quantitative measurements of the profiles. The information is scanned and its features are extracted and compared with the profiles. If the features match the storage element's profiles, the features are quantitatively evaluated to produce information expressions. If the information expressions are within the constraints specified by the constraint expressions, the information is stored into the storage element. The profiles and the constraint expressions can be adjusted to reflect the changes in the user's interests.

15 Claims, 11 Drawing Sheets

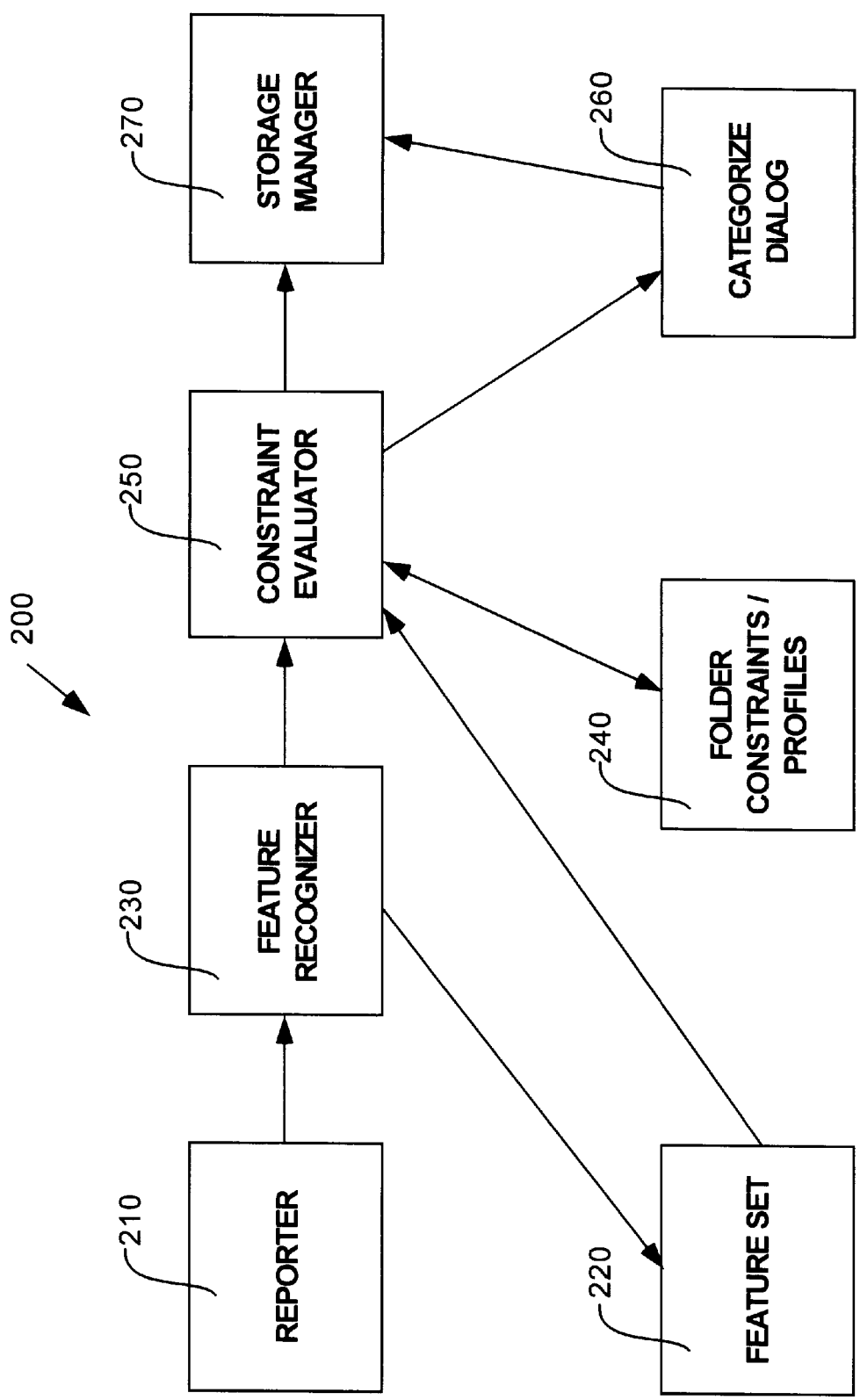

METHOD AND APPARATUS FOR AUTOMATICALLY ORGANIZING INFORMATION

BACKGROUND OF THE INVENTION

1. Field of the Invention

The present invention relates to the field of automatic organization of information. In particular, the invention relates to smart folders for storing files based on their contents and profiles of usage.

2. Description of Related Art

As access to the information superhighways becomes popular, users have to deal with a vast amount of information from a variety of sources. The task of sorting out the information based on content is increasingly more difficult.

There are a number of ways to help organize and store electronic information. One way is to increase the amount of mass storage capacity by upgrading the hard drive. It is not uncommon to find home machines with hard drives having storage capacities greater than 1 Gigabyte (GB). However, increasing storage capacity does not solve the problem of organizing data. Faced with a large amount of information, the user typically creates more directories or folders to organize and store the information for later retrieval. However, the user usually forgets the context under which he or she files the information, and will thus have to spend a large amount of time in retrieving the information.

Another organization and storage technique is a simple filing system which provides external attributes to the files or directories such as file name, date of entry. To search for a file, the user usually has to scan through the entire file system in an attempt to use these external attributes. These attributes are independent of the content or purpose of the file, and therefore are not easily remembered by the user when a large number of files are being processed.

Another way to improve the organization of files is the use of rules to govern the depositing of information in application specific folders. Examples of systems employing this technique are Eudora, CCMail, and several USENET news readers. Although this rule-based technique provides the user with some control over his or her organization of the files, it has many disadvantages. First, this rule-based disposition of messages or documents is very application-specific and applies only to messages or documents within the context of the specific application. For example, one cannot file a Word™ document in a Eudora folders without constructing an e-mail message. As another example, one must start CCMail to look at a PowerPoint presentation in a CCMail folder. Second, these rule-based systems are static and inflexible. Once a rule is set up, it does not change and cannot be adjusted unless the user modifies them specifically. Because of this, the rules can be very complex, and time consuming to maintain.

Another way to improve the organization of files is the use of indexing. One example of a system employing this technique is Wide Area Information Servers (WAIS). This method allows a user to index folders of documents by their contents. These systems allow the user to quickly search for documents with specific content. The user may also search for documents having a similar content with another document without specifying the details of the content. However, these systems do not provide automatic categorization and organization. The categorization function allows the user to file documents in multiple locations and allows a much more natural mode of information access.

It is therefore desirable to have an intelligent filing system that can automatically organize the information into folders based on the contents and profiles of usage.

SUMMARY OF THE INVENTION

The present invention discloses a method and apparatus for automatically organizing information into multiple storage elements. The method comprises the following steps: (a) generating profiles and constraint expressions associated with one of the storage elements; (b) recognizing features that match the profiles contained in the information; (c) evaluating the features to produce information expressions; (d) determining whether the information expressions match the constraint expressions; and (e) storing the information in one of those storage elements if the information expressions match the constraint expressions.

BRIEF DESCRIPTION OF THE DRAWINGS

The features and advantages of the present invention will become apparent from the following detailed description of the present invention in which:

FIG. 2B is a block diagram illustration of one embodiment of a system that operates in accordance with the teachings of the present invention.

DESCRIPTION OF THE PRESENT INVENTION

The present invention discloses a method and apparatus for automatically organizing information such as documents in an electronic filing system based on contents and usage profiles.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

THEORY OF OPERATION

Figure 1:
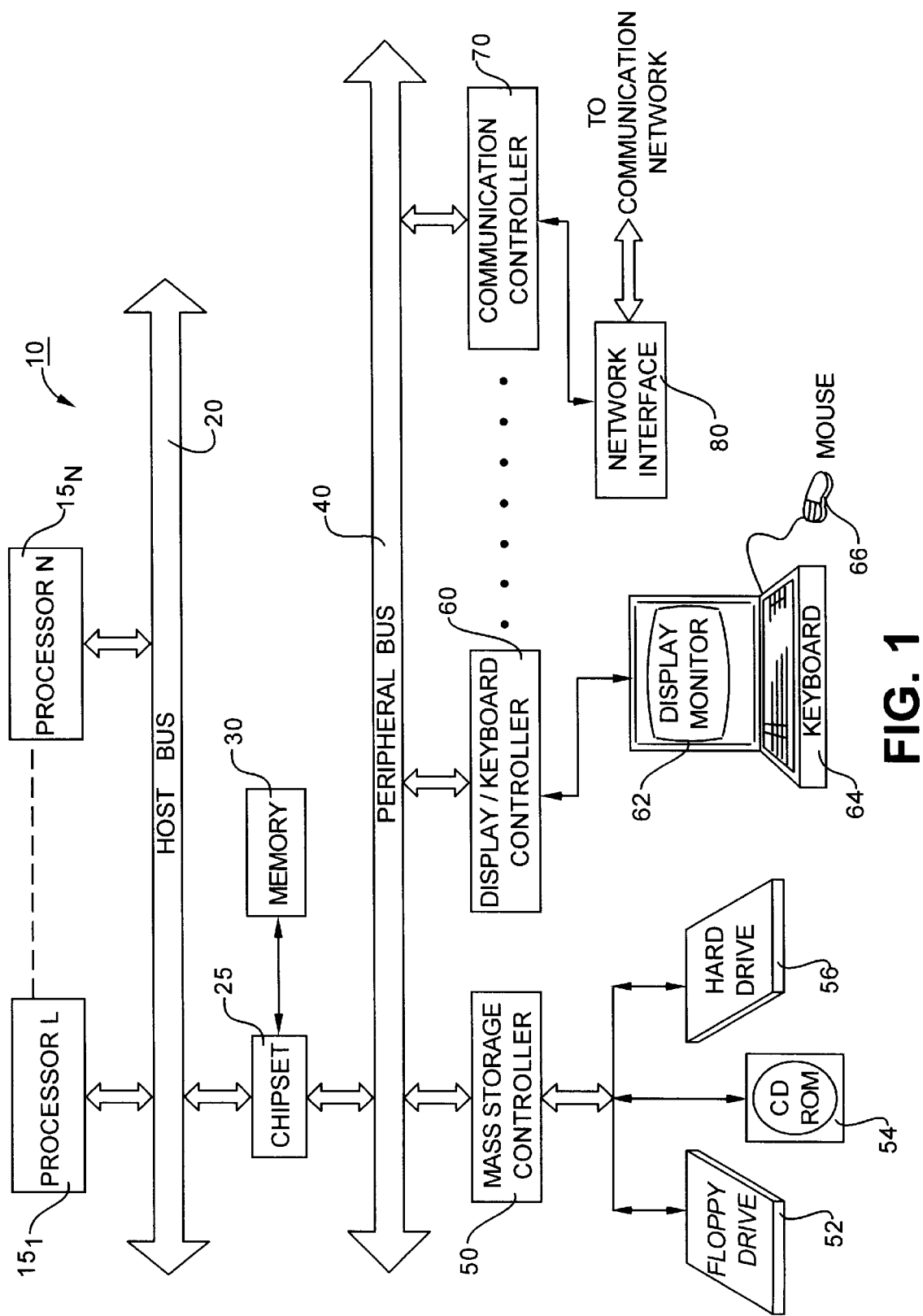
FIG. 1 is a block diagram illustrating one embodiment of a computer system utilizing the present invention.

The term "SmartFolder" is used to refer to any storage element that stores the information based on contents and/or usage profiles. The term "InfoEvaluator" refers to a system, apparatus, or a program, that is capable of evaluating the information and providing an information value representing the significance of the information with respect to some criteria. The term "Intelligent Filing System" (IFS) is used to refer to the system that automatically organizes information into storage elements based on contents and usage profiles. An example of such a system is any processor-based system such as a PC or a workstation. The "Smart-Folder Intelligent Filing System may be installed on the system as shown in FIG. 1. It is apparent to one of ordinary skill in the art that other microprocessor-based systems may implement the Smart Folder IFS.

The SmartFolder Intelligent Filing System (IFS) allows the user to define a set of rules that allow the document to be filed in multiple contexts of the user's choosing. This automatic filing process is less susceptible to lapses of human memory, and the rules can be defined in terms of "learning" profiles that automatically adjust as the user organizes the desktop. The documents are categorized by their contents. Therefore, the tedious process of searching based on contents is eliminated.

The SmartFolder IFS is document-oriented rather than application-oriented. The filing of the documents is independent of the application (e.g., Eudora, CCMail, USENET news readers) that is supplying the document. The Smart-Folder IFS allows the user to set up a rule based on a learning "profile" which captures the history of usage of the user over time. The profile can adjust according to user's actions to become better and better at categorizing the user's documents, even if the user cannot state exactly what the rules are for the categorization. In other words, the Smart-Folder IFS "learns" the rules based on how the user arranges the information.

Indexing is the traditional method for searching documents in an electronic filing system. Although the Smart-Folder IFS uses indexing, the indexing is used merely for labeling purpose. The categorization function of the Smart-Folder IFS allows the user to file documents in multiple locations and allows a much more natural mode of information access than specific searches based on indexing only.

In the SmartFolder IFS, all documents are stored in a unified and industry standard format. For example, the Microsoft Structured Storage facility of OLE2.0 provides this standard file format. This allows the SmartFolder IFS and the Viewer applications to interact without explicit knowledge of each other.

When a document in Structured Storage Format is submitted to a SmartFolder, the document is abstracted into a list of features or attributes. These features are then used by the SmartFolder Constraint system to evaluate the candidate document for this folder. The extracted features can be described in three categories:

(1) Simple File Attributes

The standard attributes of a file, its name, size, date of creation, etc. are features that can be used for SmartFolder. This allows rules like, "new Word documents larger than 1 Mb go in this folder".

(2) Content Attributes

The Structured storage file format defines a standard property set for a document that includes features such as subject/title, author, abstract, date/time originated, etc. These features can also be used for the SmartFolder IFS rules. In addition, the SmartFolder IFS will include recognized features, Uniform Resource Locators (URLs), Email addresses, names, place names, dates/times, and the like that can be extracted from the document text using pattern matching algorithms. And finally, each term in the document is also a feature, so traditional rules like "documents that contain the term 'Intel' go in this folder" can be specified by the user.

(3) Compound Attributes

In addition to attributes that are directly extracted from the document, the SmartFolder IFS will use attributes that are derived from this document's relationship to the user, or to other documents in the folder. Some examples of the compound attributes are the evaluation value (Evalue) and the WAIS score. The 'Evalue' of a document from the InfoEvaluator system (scored against the user's profile) can be used just as any other feature of the document (see "Constraints and Profiles" below). The WAIS indexing system has the facility to be able to calculate a 'weight' for a document based on it's similarity to other documents. This weight value could be used to specify SmartFolder rules like "This folder accepts documents that are like the other documents that are already here".

The storage management of the SmartFolder IFS allows the construction of information categorizers by letting the user build hierarchies of folders. Each folder, when it receives a document, attempts to give that document to each of its child folders. So the higher level folders provide a pre-filter for their children. These hierarchies can be arbitrarily deep so the user is free to build as simple or as complex a categorization system as is necessary.

The addition of a standard "categorize" dialog allows the user to avoid the "where do I put this where I can find it again?" question when saving a new document. Rather than deciding what single context the document should be placed in, the user can assign multiple contexts, and retrieve the document from any one of those contexts. With the addition of long file names in newer PC operating systems, the user's ability retrieve documents by their context is greatly enhanced.

Constraints and Profiles

As mentioned above, a SmartFolder is associated with a set of constraints or rules that govern what documents are eligible to be placed in that folder. These rules can refer to indirect attributes that are calculated by evaluating the feature set of the document against a user profile. This facility is implemented using the InfoEvaluator technology one embodiment of which is described in the U.S. patent application, "Information Evaluation", Ser. No. 08/367,991 filed Jan. 3, 1995, now U.S. Pat. No. 5,799,304 assigned to the same assignee of the present invention. It is apparent to one of ordinary skill in the art that other information evaluation techniques as known in the art, may be utilized.

As the user uses the "Categorize" dialog or moves documents from a SmartFolder to another, the InfoEvaluator Profiles can be trained to more accurately reflect the user's desired organization. This facility allows the SmartFolder IFS to be adaptive to changes in the user's interests or organizational methods. The detailed description of the categorize dialog facility will be provided in the following.

IMPLEMENTATION

Referring to FIG. 1, an illustrative embodiment of a computer system utilizing the present invention is shown. The computer system 10 comprises one or more processors $15_1$–$15_N$ ("N" being a positive whole number) and a main memory element 30 coupled together by a chipset 25. Examples of the main memory element 30 includes a dynamic random access memory (DRAM) and a static random access memory (SRAM). In general, the chipset 25 operates as an interface between a host bus 20 and a peripheral bus 40.

In one embodiment, the processors $15_1$–$15_N$ are the Pentium® or Pentium® Pro microprocessors manufactured by Intel Corporation at Santa Clara, Calif. It is understood by one of ordinary skill in the art that other processors may be implemented in the present invention.

Chipset 25 typically includes a cache DRAM controller (CDC), a peripheral bus controller, and a data path unit (DPU).

The host processor 20 can support transactions between a number of connected processors $15_1$–$15_N$ or between the processors $15_1$–$15_N$ and the chipset 25. In particular, the host bus 20 may be referred to as a parallel bus or a multiprocessor bus because it supports parallel operations and multiple processors. This host bus 20 may also operate in a pipelined manner to increase efficiency. However, these features should not be construed to limit the teachings of the present invention. The present invention can be utilized if there is only one processor connected to the host bus 20.

A peripheral bus 40 provides a communication path between the processors $15_1$–$15_N$ or main memory element 30 and a plurality of peripheral devices. Examples of such peripheral devices are mass storage controller 50, display/keyboard controller 60, and communication controller 70. In one embodiment, peripheral bus 40 is a Peripheral Component Interconnect (PCI) bus.

The mass storage controller 50 is interfaced to a number of mass storage devices such as floppy drive 52, CDROM drive 54, and hard disk drive 56. The display keyboard controller 60 is interfaced to user's devices such as display monitor 62, keyboard 64, pointing device (e.g., mouse) 66. The communication controller 70 is interfaced to a network interface 80 which is connected to a communication pathway or network providing access to Internet and other information superhighways.

Figure 2A:
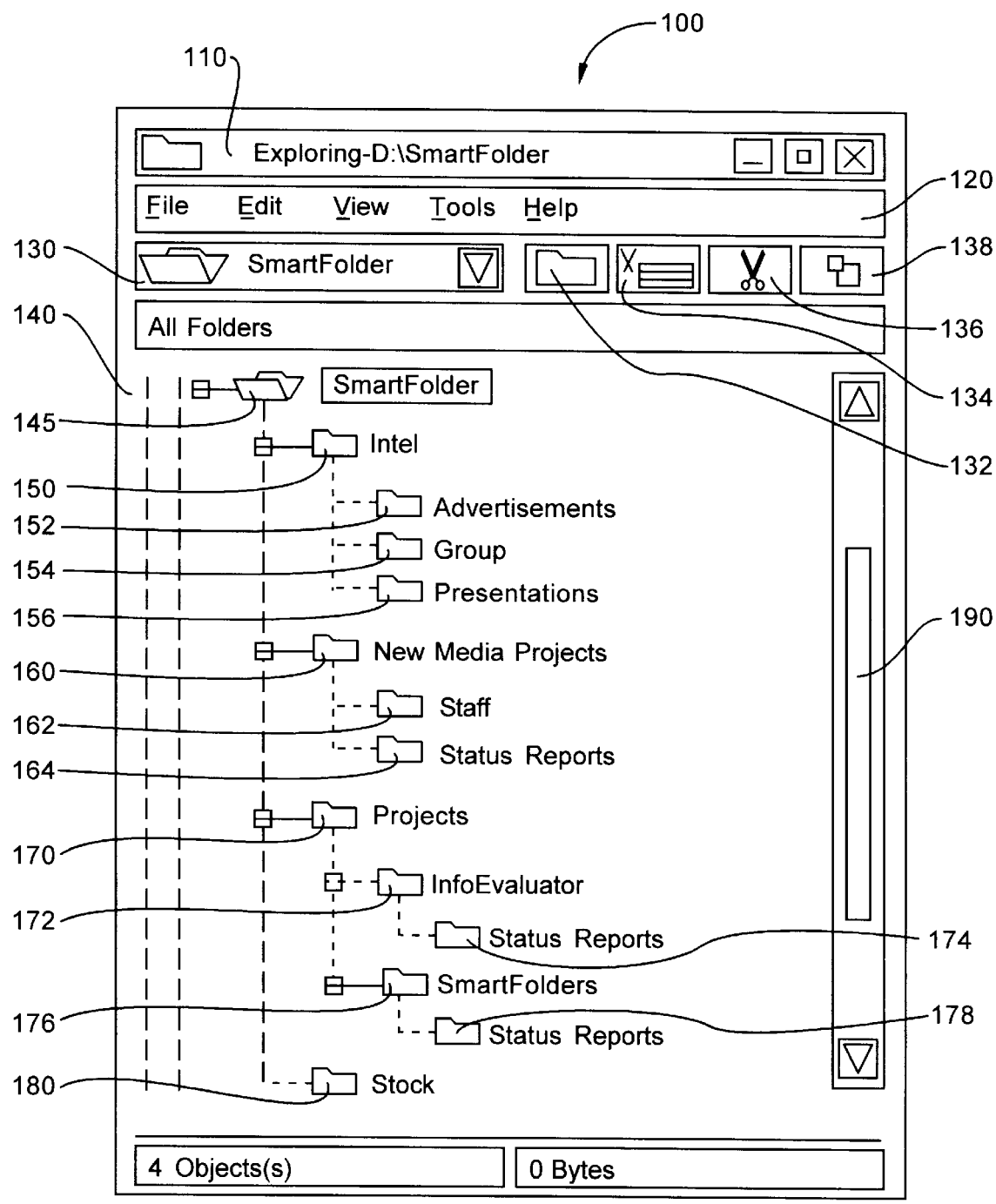
FIG. 2A is an illustrative screen display of one embodiment of the organization of the filing system in accordance with the teachings of the present invention.

FIG. 2A illustrates a screen display 100 on display monitor 62 showing one embodiment of a hierarchical arrangement of the various folders and files in accordance with the teachings of the Smart Folder System of the present invention. In one embodiment, the display format show in screen display 100 is similar to that of Windows®95 which is an operating system developed by Microsoft Corporation of Redmond, Wash. However, the teachings of the present invention may be practiced without utilizing any specific operating system or computing platform.

Screen display 100 comprises Title bar 110, Menu bar 120, Open Folder 130, Display Window 140, and Scroll bar 190. Title bar 110 indicates the selected program and folder. On this screen display, the program SmartFolder is located at drive D in hard drive 56 in FIG. 1.

Menu bar 120 contains a choice of menu items including File, Edit, View, Tools, and Help. Clicking on any one of these menu items enables the user to retrieve a corresponding list of submenu items.

Open Folder 130 shows the name of the folder currently opened together with the icons in the tool bar. These icons are the standard icons in the Windows®95 platform. For example, Folder Up One Level 132 is used to go up to the parent folder. Assign Network Drive 134 is used to assign a drive letter to a network drive. Icons Cut 136 and Copy 138 are used for operations that move or copy files or folders.

Display window 140 shows one embodiment of the file organization architecture. The organization of the filing system is similar to a tree structure. Folders or documents are arranged at various hierarchical levels as branches in a tree. The Root Folder 145 is the highest selected folder in this filing system. As shown in FIG. 2A, the Root Folder Icon 145 is an open folder with the name SmartFolder. Under this root are the first level folders. For this illustrative example, there are four first-level folders: First-level folders 150, 160, 170, and 180 named Intel, New Media Projects, Projects, and Stock, respectively. Each of these first-level folders may in turn have one or more second-level folders. For this illustrative example, First-level folder Intel 150 has three second-level folders 152, 154, and 156, with names Advertisements, Group, and Presentations, respectively. First-level folder New Media Projects 160 has two second-level folders 162 and 164 with names Staff and Status Reports, respectively. First-level folder Projects 170 has two second-level folders InfoEvaluator 172 and SmartFolder 176. First-level folder Stock 180 has no second-level folders.

Second-level Folder InfoEvaluator 172 has a third-level folder Status Reports 174. Second-level folder SmartFolder 176 has a third-level folder Status Reports 178.

Scroll bar 190 allows the user to scroll the display up or down to view the entire tree of the file system.

Referring to FIG. 2B, a block diagram illustrating one embodiment of the system architecture for the SmartFolder Intelligent Filing System (IFS) in the present invention is shown. The SmartFolder IFS 200 comprises a Reporter 210, a Feature Set 220, a Feature Recognizer 230, a Constraint Evaluator 250, a set of Folder Constraints/Profiles 240, a Categorize Dialog 260, and a Storage Manager 270.

The Reporter 210 scans the documents to pull out the relevant documents based on some preprogrammed key words. The Reporter 210 may be integrated to specific services (e.g., Email, USENET news, news wire service, on-line services) to files stories as they arrive, or to contact the service on a periodic basis to retrieve the relevant documents.

The Feature Recognizer 230 takes the results from the Reporter 210 and extracts and recognizes the features relevant to the documents in accordance to the selected folders. Theses features are forwarded to the Feature Set 220 and the Constraint Evaluator 250.

The Feature Set 220 contains all the features characterizing the documents. The Feature Set 220 may be augmented by the newly extracted features from the Feature Recognizer 230. These features are forwarded to the Constraint Evaluator 250 for evaluation.

The Constraint Evaluator 250 receives the features of the documents from the Feature Recognizer 230, the set of features from the Feature Set 220, and the constraints and profiles from the Folder Constraints/Profiles 240. The Constraint Evaluator 250 evaluates the features of the documents based on the profiles, and interacts with the Categorize Dialog 260 before forwarding the document to the Storage Manager 270.

The Categorize Dialog 260 provides an interactive session during which the user selects the folders that would accept the current documents. The description of the Categorize Dialog 260 is discussed later.

The Storage Manager 270 receives the document processed by the Constraint Evaluator 250 and optionally interacts with the user through the Categorize Dialog 260. The Categorize Dialog 260 allows the user to modify the folders or storage areas with the document to be filed. The Storage Manager 270 then files the document into appropriate folders and/or storage areas.

Figure 3:
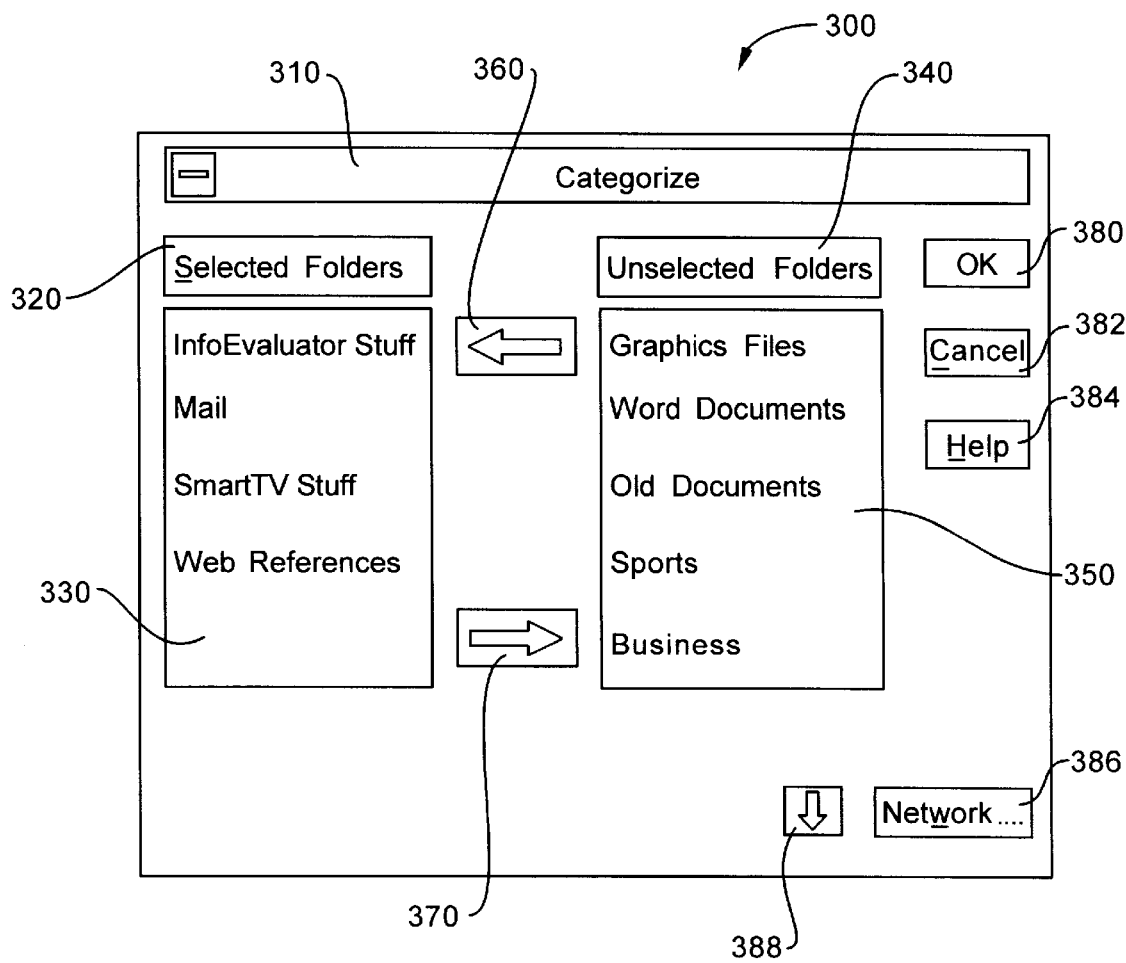
FIG. 3 is an illustrative screen display of one embodiment of the categorization of the folders.

Referring to FIG. 3, a screen display of a session illustrating the operation of the Categorize Dialog process is shown. The Categorize Screen 300 shows an example of a interactive session between the user and the Categorize Dialog process. Toolbar 310 shows the session name, in this case, Categorize. Selected Folders 320 shows the list of those folders selected by the user to contain the document being filed. Selected Folder List 330 shows the names of the folders selected to contain the document. Unselected Folders 340 shows the list of the folders that are not selected to contain the document. Unselected Folder List 350 shows the names of the folders that are not selected to contain the document. Left Arrow 360 moves the highlighted folder selected by the user from Unselected Folder List 350 to Selected Folder List 330. Right Arrow 370 moves the highlighted folder selected by the user from Selected Folder List 320 to Unselected Folder List 350.

Selection of the icon OK 380 ends the categorize session with the selected folders shown in the Selected Folder List 330. The icon Cancel 382 cancels the categorize session and restores the original Selected Folder List 320 and Unselected Folder List 350. The icon Help 384 provides a help menu to guide the user through the categorize session. The icons Network 386 and Down Arrow 388 provide access to Network.

Each folder has a list of constraints and profiles initially created by the user. A document is put in a particular folder if it satisfies the folder's constraints and fits its profiles. The profiles of a folder are the key words or features that characterize the contents of the documents stored in the folder. For example, a user may create the profiles of a folder including terms such as stock, Intel, Microsoft having equal significance. Therefore, a story about the rising of Microsoft's stocks after the delivery of a new network software package seems to fit the profiles of the folder. The constraints of a folder provide a quantitative means to characterize the folder's properties including the profiles and other characteristics. For example, the constraints of a folder may include an interesting factor as evaluated by the InfoEvaluator of 50 (from a range of 0 to 100) and a file date of less than 2 days.

Figure 4A:
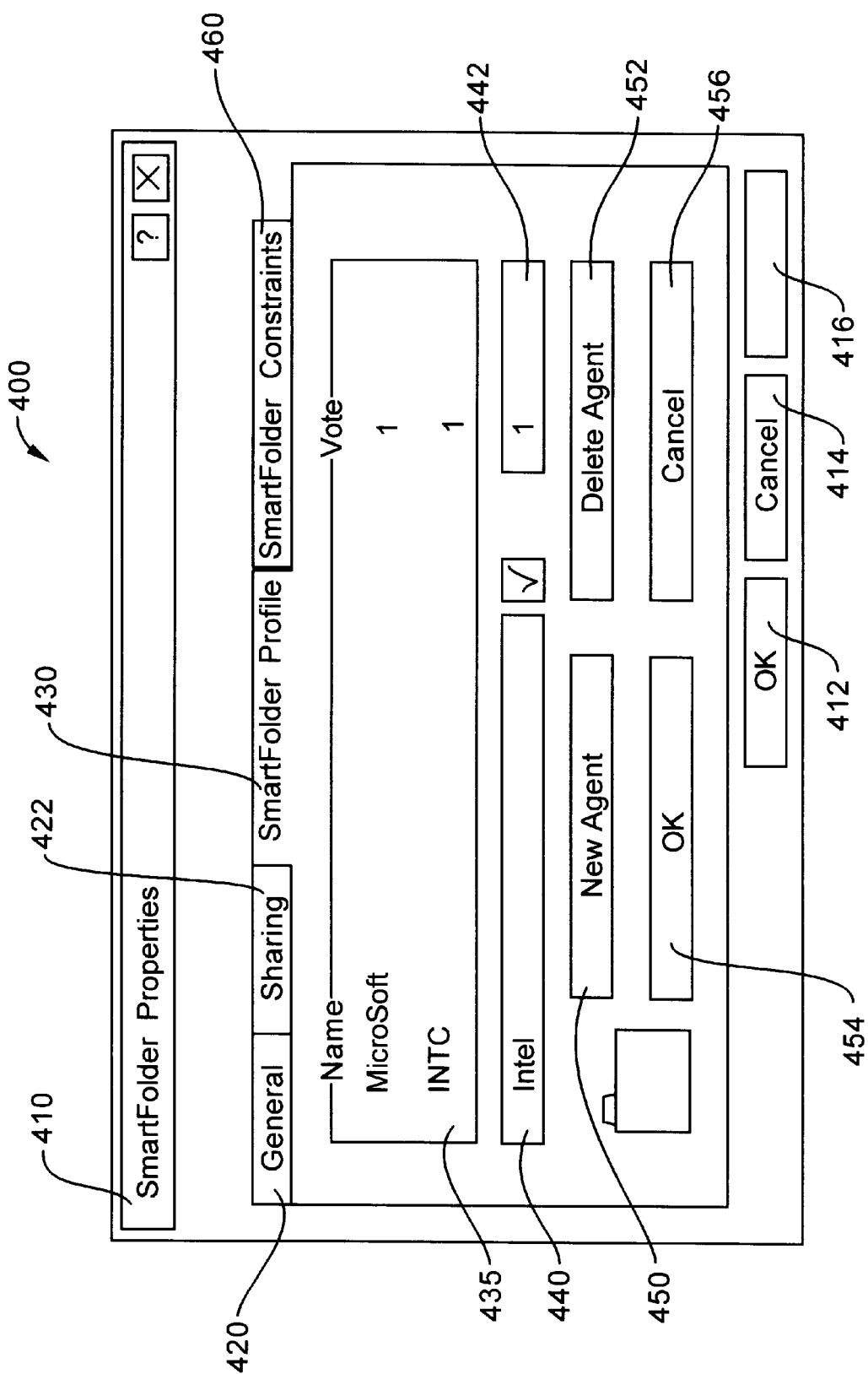
FIG. 4A is an illustration of a screen display of one embodiment of the smart folder profile.
Figure 4B:
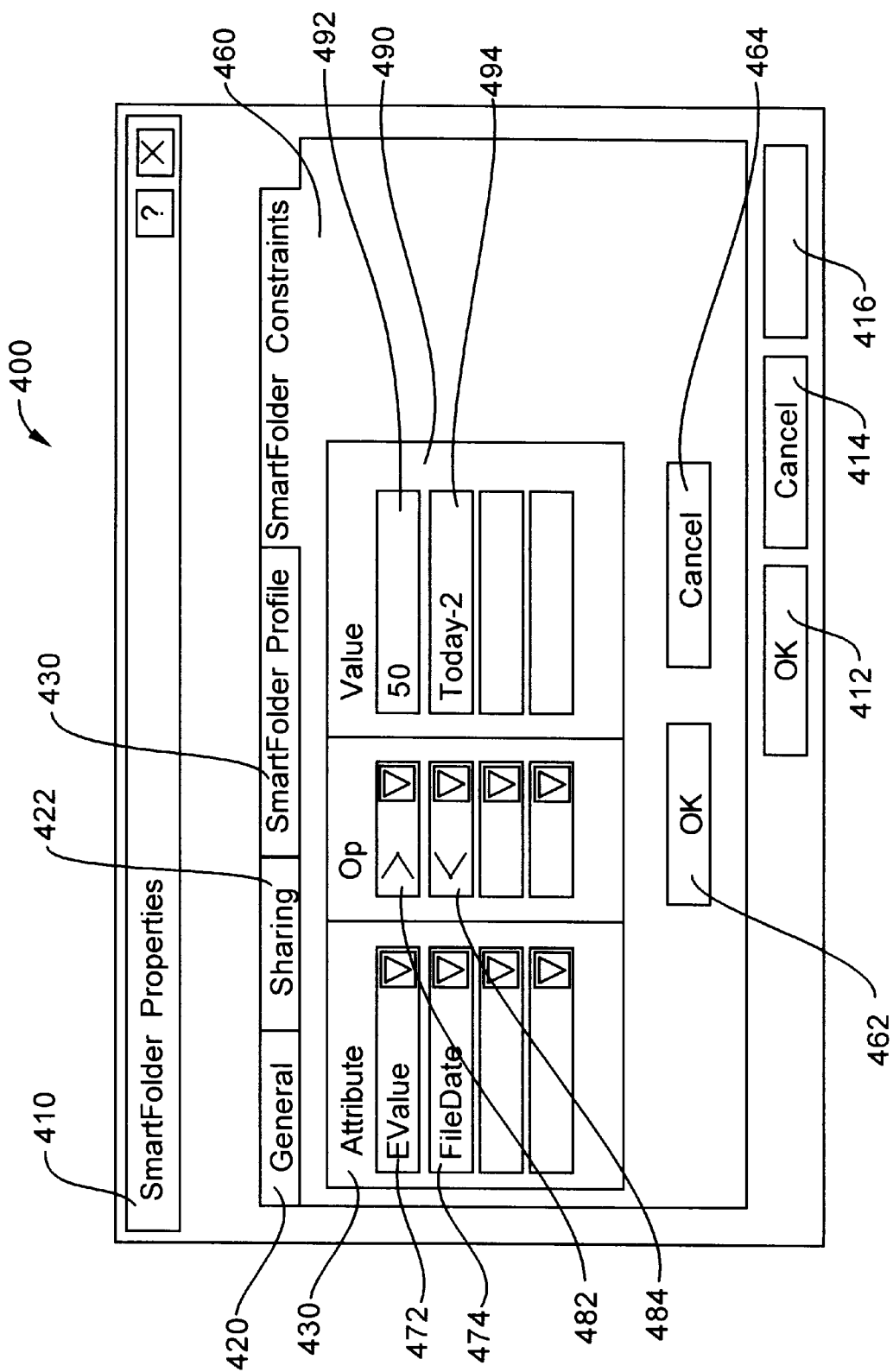
FIG. 4B is an illustration of a screen display of one embodiment of the smart folder constraints.

FIGS. 4A and 4B show an example of a session to create the folder's profiles and constraints. Referring to FIG. 4A, the Folder Properties Screen 400 shows the folder properties for the profiles. Menu bar SmartFolder Properties 410 indicates that the properties of the folder are being entered. Properties Icon OK 412 ends the session using the entered properties. Properties Icon Cancel 414 ends the session without changing the folder's properties.

SmartFolder Properties 410 includes four tabs: General 420, Sharing 422, Profile 430, and Constraints 460. General 420 includes general items about the folder such as names, date when first created, size, etc. Sharing 422 shows the list of other folders that shares the documents contained in the folder. Profile 430 shows the profile of the folder. Constraints 460 show the constraints and the combinations of these constraints of the folder.

Profile List 435 contains the list of the features or key words that characterize the contents of the documents contained in the folder. Folder List 435 has two components: Name and Vote. Profile Name is the name of the profile or key word, and Vote is the voting power of the corresponding profile name. Select Name 440 displays the name of a key word to be added or deleted. Select Vote 442 shows the voting power for the corresponding key word in Select Name 440. New Agent 450 indicates if the Select Name 440 is added to the Profile List 435. Delete Agent 452 is used to delete or remove the Select Name 440 from the Profile List 435. Profile Icon OK 454 ends the profile selection. Profile Icon Cancel 456 cancels the profile selection and restore back to the original profile.

Referring to FIG. 4B, an example of the constraints of a folder is shown. Constraints 460 include Attribute 470, Operator 480 and Value 490. Attribute 470 contains a list of the folder attributes that can be used as constraints. Typical attributes are the value as evaluated by the InfoEvaluator and the file date. Operator 480 contain the corresponding operators that link the attributes to the values. Typical operators are greater than (>), less than (<), equal to (=), greater than or equal to ($\geq$), and less than or equal to ($\leq$). Value 490 provides the specific quantities that set the constraints for the corresponding attributes. The quantities may be numbers with some known meaning or symbolic terms. For the example shown in FIG. 4B, there are two constraints: the attribute EValue 472 has the Operator Greater Than 482 and a Value of 50 (Item 492), the attribute File Date 474 has the Operator Less Than 484 and a Value of TODAY-2 (Item 494). To change the value, the user enter the desired value in the appropriate spaces 492 or 494. If the user is satisfied with the constraints, pressing the Icon OK 462 ends the session and the constraints are saved. Pressing the Icon Cancel 464 retains the original constraints.

Figure 5:
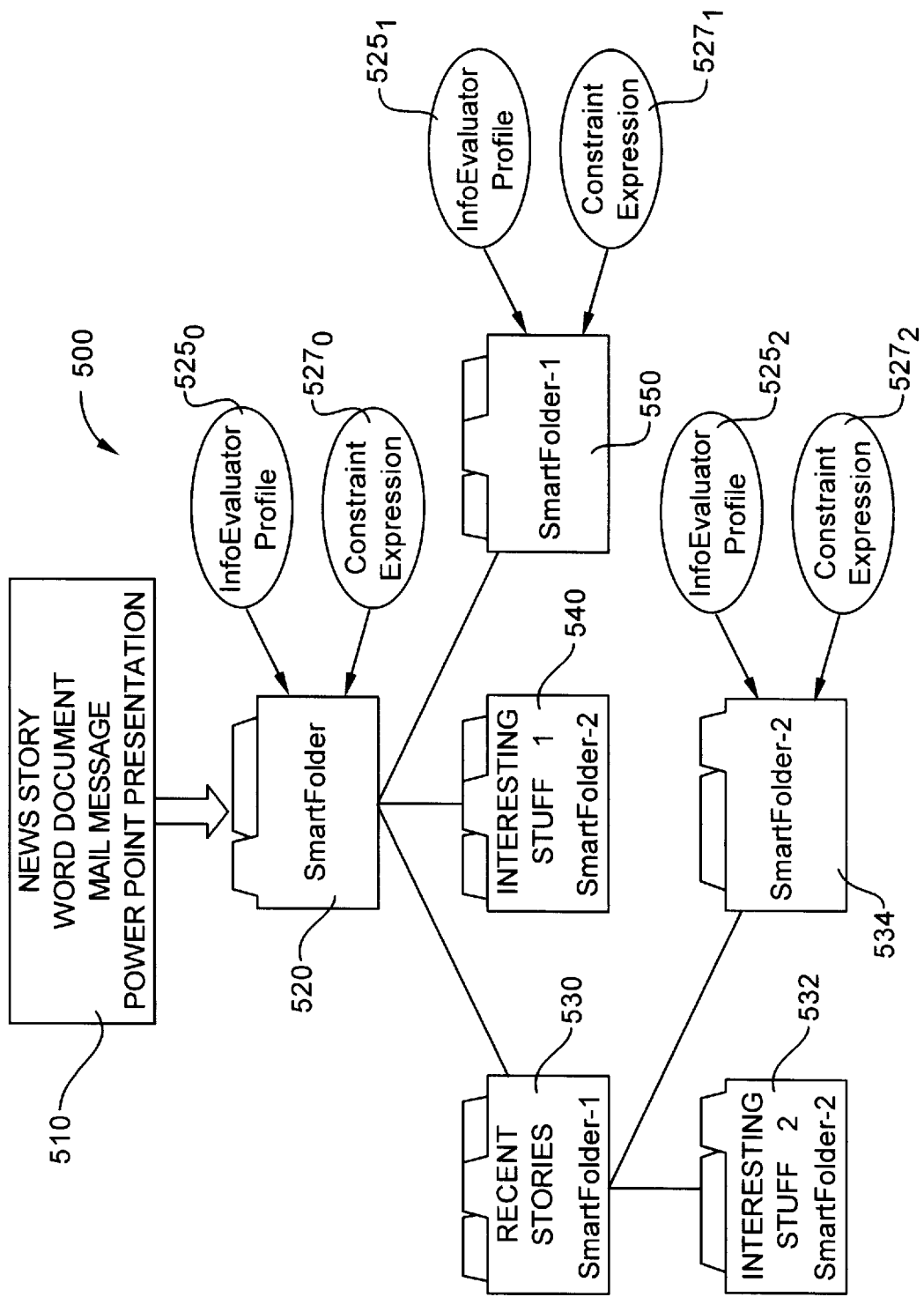
FIG. 5 is a structure diagram showing one embodiment of the processing of an input document from a parent smart folder to folders at lower levels.

Referring to FIG. 5, an example showing the processing of an input document from a parent SmartFolder to folders at successive levels. A Folder Tree 500 consists of three levels. The input document 510 may be any one of a news story, a Word document, an e-mail message, a Power Point presentation, and any other computer readable documents. The root level has the Parent Folder 520. The Input Document 510 is processed to produce relevant attributes that can be compared against the InfoEvaluator Profile 525, and the Constraint Expressions 527 where "k" denotes the tree level (k=0 corresponds the root node). The next level consists of Recent Stories Folder 530, Interesting Stuff-1 Folder 540, and SmartFolder-1 550. In this example, Input Document 510 satisfies the profiles and constraints of Recent Stories Folder 530 and therefore it is stored in Recent Stories Folder 530. Similarly, Input Document 510 satisfies the profiles and constraints of Interesting Stuff-1 Folder 540 and is stored in Interesting Stuff-1 Folder 540. However, Input Document 510 does not completely satisfy the profiles and constraints of SmartFolder-1 550 and therefore it is not stored in SmartFolder-1 550. The last level includes Interesting Stuff-2 Folder 532 and SmartFolder-2 534. The Input Document 510 satisfies the profiles and constraints of Interesting Stuff-2 532 and is stored in Interesting Stuff-2 532. However, Input Document 510 does not satisfy completely the profiles and constraints of SmartFolder-2 534 and is not stored in SmartFolder-2 534.

Figure 6:
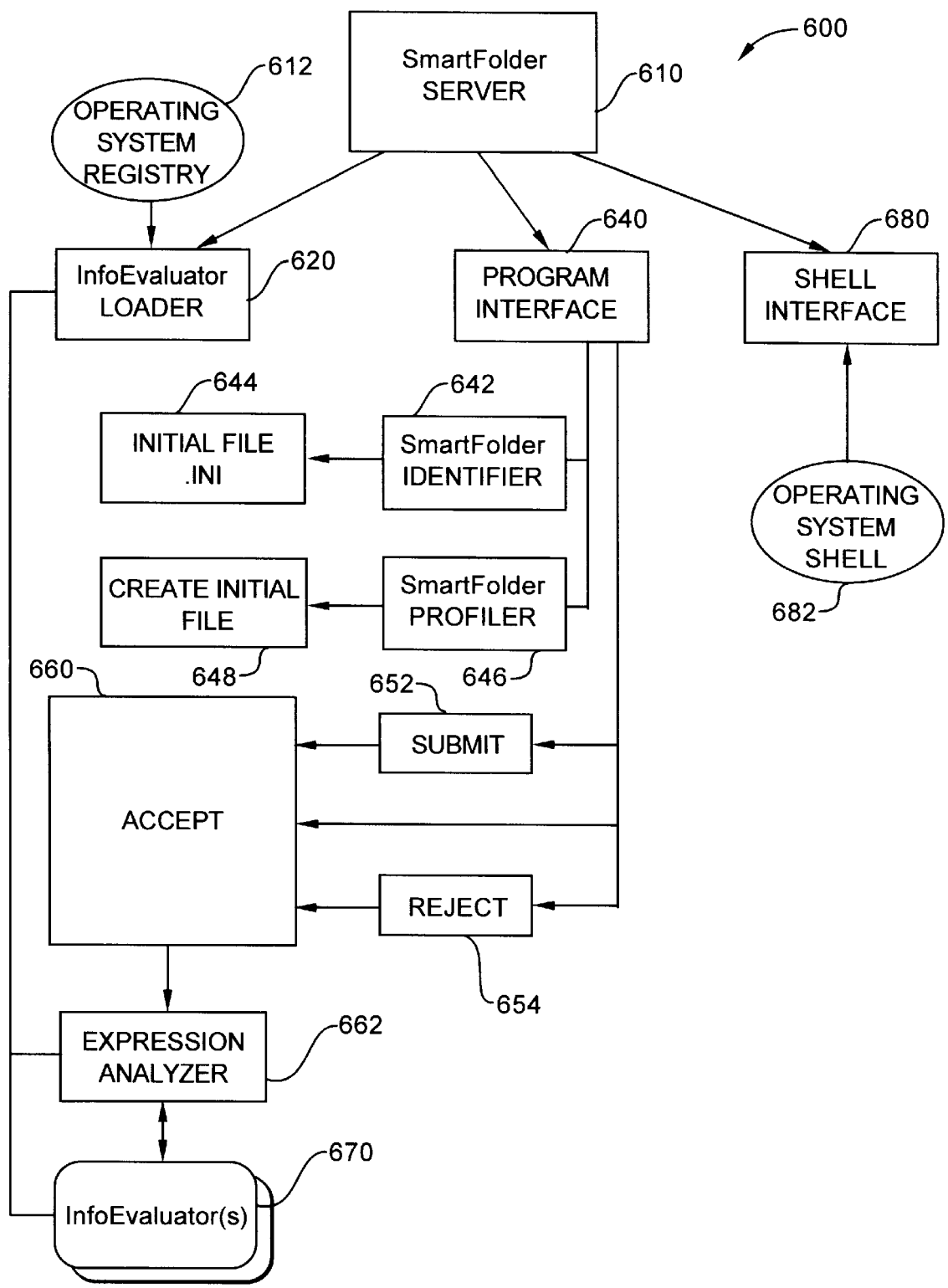
FIG. 6 is a structure diagram showing one embodiment of the processing modules in the smart folder system.

Referring to FIG. 6, a structure diagram illustrating the operation of one embodiment of the present invention is shown. SmartFolder Structure 600 is the overall organizational structure of the SmartFolder which interfaces to the operating system Windows® 95 via Shell Interface 680. As is understood by persons of ordinary skill in the art, the use of Windows® 95 is for illustrative purpose. Any suitable operating system or platform can be utilized. SmartFolder Server 610 represents the environment over which the folders in SmartFolder are created and maintained. The environment may be a single workstation, a desktop computer, a notebook computer, or a computer in a network. SmartFolder Server 610 includes InfoEvaluator Loader 620, Program Interface 640, and Shell Interface 680.

InfoEvaluator Loader 620 loads the evaluation algorithm specified for this folder hierarchy. Program Interface 640 provides the programming interface to the SmartFolder system. Shell Interface 680 provides the interface to the operating system users' interface in operating system shell 682.

InfoEvaluator Loader 620 receives the evaluators from the operating system Registry 612, and the specific algorithms and profiles as generated by the InfoEvaluators 670. InfoEvaluator Loader 620 passes the Evaluator ID to an Expression Analyzer 662 and exchange information with InfoEvaluators 670.

The Program Interface 640 includes two modules: a SmartFolder Identifier 642 and a SmartFolder Profiler 646. SmartFolder Identifier 642 identifies the file system that should be "smart". SmartFolder Identifier 642 does this by loading the constraints from the Initial File .INI file 644. SmartFolder Profiler 646 sets the rules and profile for a new SmartFolder. Create Initial File 648 creates a SmartFolder with the .INI extension.

The Submit Process 652 submits a document to be categorized by the folder and its children. The Reject Process 654 trains the system to reject a mis-categorized document. The InfoObject instances from Program Interface 640. Submit Process 652, and Reject Process 654 are fed to the Accept Process 660. The Accept Process 660 accepts or rejects a document based on the constraint expressions which may include evaluation values from the InfoEvaluators 670. Expression Analyzer 662 analyzes the constraint expressions and converted them into appropriate format for processing. InfoEvaluators 670 obtains the InfoObject instances from Expression Analyzer 662 and returns the Evalue. On the basis of the Evalue(s) returned by InfoEvaluators 670 and other constraint expressions, the Accept Process 660 sends the result of whether a document is accepted or rejected in a folder back to the Submit Process 652 and Program Interface 640.

Figure 7:
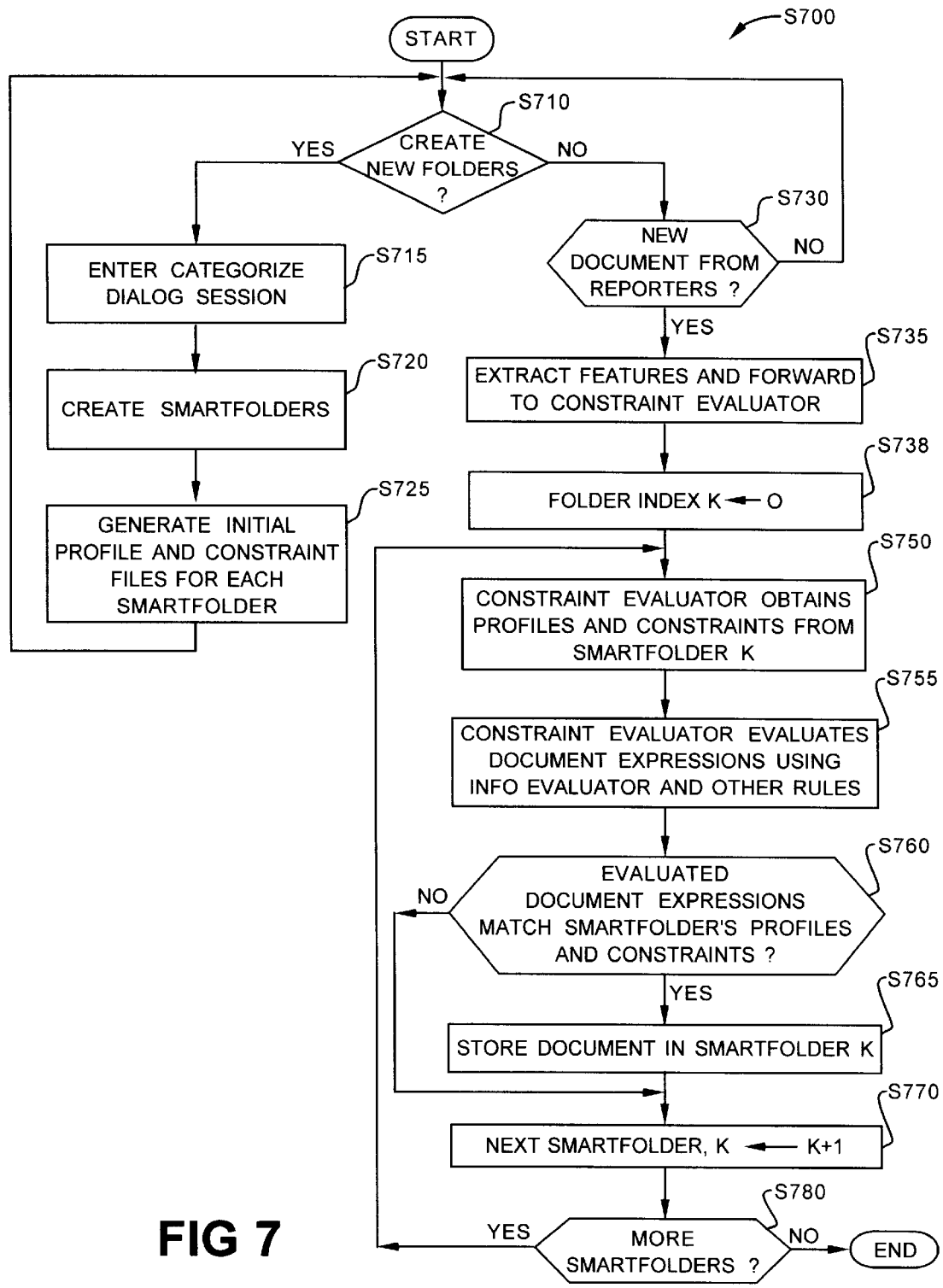
FIG. 7 is a flow chart illustrating one embodiment of the SmartFolder Intelligent Filing System.

Referring to FIG. 7, a flowchart illustrating one embodiment of the method in accordance to the teachings of the present invention.

The process S700 begins at the START state. From the START state, the process S700 determines if new folders are to be created (Step S710). A folder here refers to any storage element that can be organized as part of a filing system. If a new folder is to be created, process S700 proceeds to step S715; otherwise, process S700 goes to a decision step S730. In step S715, the user enters the Categorize dialog interactive session. The user creates the Smartfolders and arrange the hierarchy of the folders according to his or her preference (Step S720). Next, the user generates the initial profile file and constraint file for each of the created Smartfolders (Step S725). Process S700 then returns back to the decision step S710. In decision step S730, it is determined if there is any new information or document to be filed. The arrival of a new document to be filed is normally flagged by the reporter. If there is no new document to be filed, process S700 returns to decision step S710. If there is new document to be filed, process S700 proceeds to step S735. In step S735, the features of the new document are extracted and forwarded to the Constraint Evaluator for determining what folder the document is filed into.

The filing is carried out by going through all the created folders. The folder index k is initialized in step S738. The Constraint Evaluator then obtains the profile and constraint files of the Smartfolder k (Step S750). Using the InfoEvaluator and other rules, the Constraint Evaluator evaluates the document expressions (Step S755). The document expressions may include the information values of the document and other values such as the document age, size, source, etc. The InfoEvaluator computes the information value for the document based on the profiles of the folder. Other rules to evaluate the document expressions include file data such as time, date, size, source etc. The document expressions contain expressions that correspond to the constraint expression of Smartfolder k. Process S700 then proceeds to decision step S760. In decision step S760, it is determined if the document expressions match the constraint expressions of the Smartfolder k. This step is carried out by comparing the information values and other document values to the corresponding values in the constraint expressions. The combinations of these constraints is also evaluated. These combinations may include logic relations such as AND, OR. The result of the matching is used to determine if the document is to be filed in Smartfolder k.

If the evaluated document expressions match the constraint expressions of Smartfolder k, process S700 proceeds to store the document in Smartfolder k (Step S765). Otherwise, Process S700 skips the storing and moves to the next folder (Step S770). The process S700 determines if another Smartfolder needs to be considered (step S780). If it is, Process S700 returns to step S750. If not, process S700 terminates.

Figure 8:
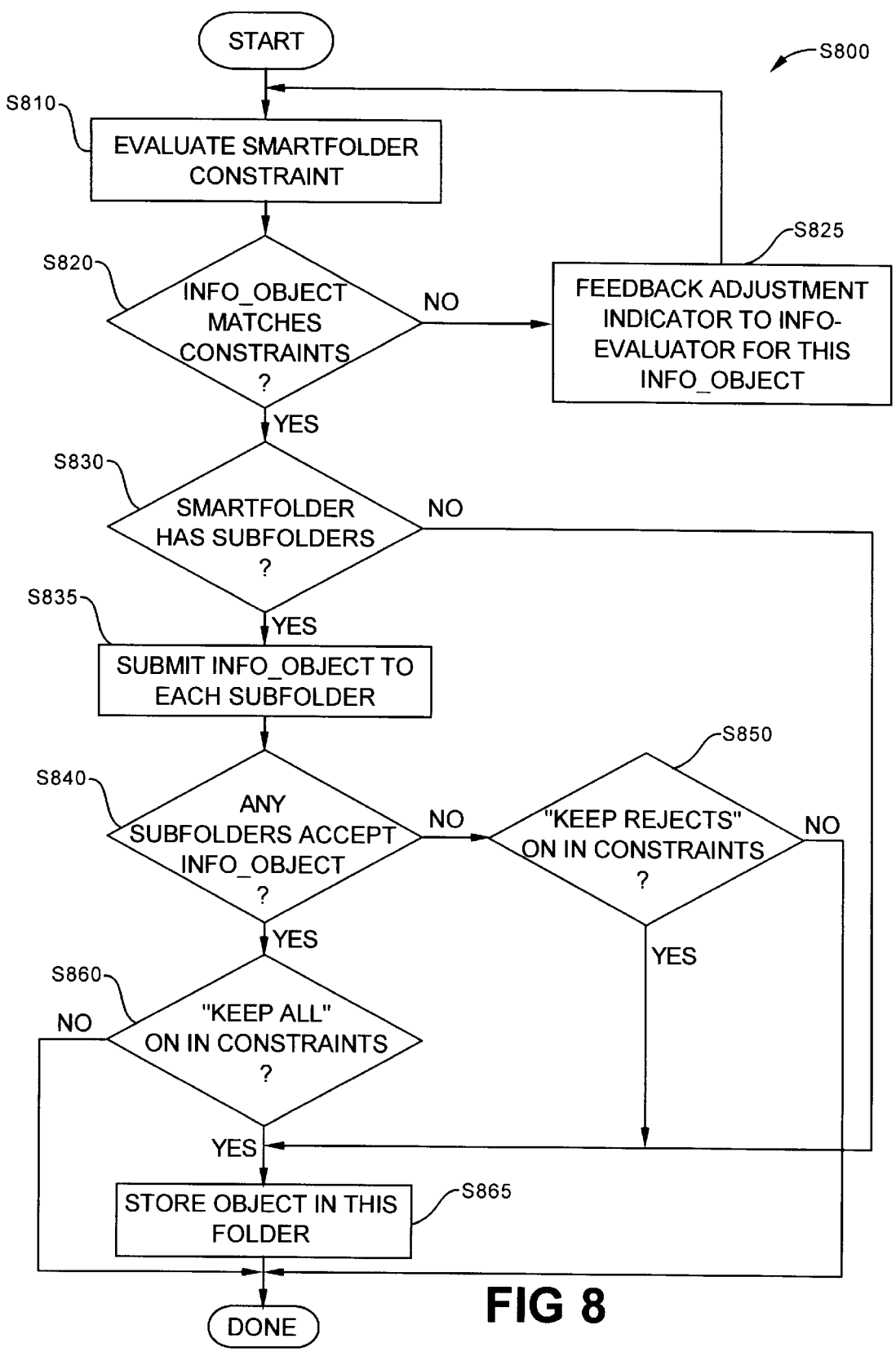
FIG. 8 is a flow chart illustrating one embodiment of the training of the Submit process.

Referring to FIG. 8, a flowchart illustrating a training process S800 for the Submit process is shown. In the Submit process, a folder is trained to accept the document and adjusts the information evaluator as necessary. The document is referred to as an InfoObject. The process begins at the START step. Then the process evaluates the SmartFolder constraints (Step S810). The evaluation utilizes the SmartFolder constraint file (SmartFolder.INI) and the InfoEvaluator information from the server. It is then determined if the InfoObject instances match the constraints at the decision step S820. If NO, the process S800 feeds back an adjustment indicator to the InfoEvaluator Server for this InfoObject (Step S825). The adjustment indicator informs the Information Evaluator to adjust its parameters such that the information value is computed in the direction to satisfy the constraints. If YES, it is next determined if the SmartFolder has sub-folders at the decision step S830. If the SmartFolder does not have any sub-folders, the process goes to step S865 in which the object is stored in the folder and the process is completed. If the SmartFolder has sub-folders, process S800 proceeds with submitting the InfoObject to each sub-folder (Step S835). Each sub-folder then essentially performs similar constraint matching steps to determine if it can accept the InfoObject (Step S840). If it does not accept the InfoObject, process S800 proceeds to decision step S850. If the folder accepts the document, process S800 proceeds to the decision step S860. In the decision step S850, it is determined if there is any constraint that specifies keeping the rejected document. If YES, process S800 proceeds to store the rejected document in the folder (Step S865). If NO, process S800 terminates. In the decision step S860, it is determined if there is any constraint that specifies keeping the accepted document. If NO, process S800 terminates. If YES, process S800 proceeds to store the document in the folder (Step S865).

Figure 9:
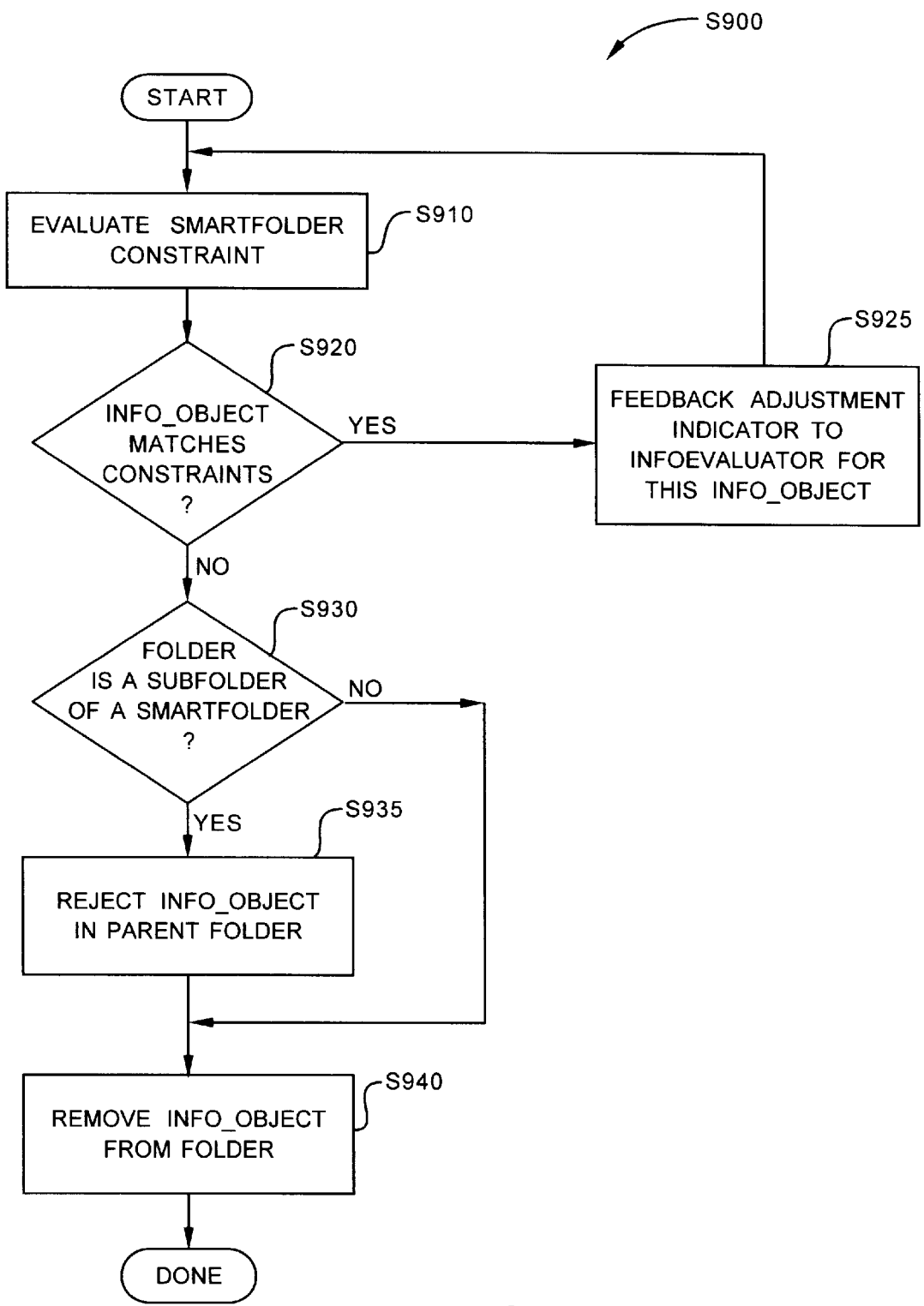
FIG. 9 is a flow chart illustrating one embodiment of the training of the Reject process.

Referring to FIG. 9, a flowchart illustrating a training process S900 for the Reject process is shown. The Reject process is trained to reject the document and adjusts the Information Evaluator accordingly. From the START state, the process S900 evaluates the SmartFolder constraints (Step S910). The evaluation utilizes the constraint file (SmartFolder. INI) and the InfoEvaluator information from the server. Then process S900 proceeds to the decision step S920 to determine if the document matches all the constraints. If YES, process S900 proceeds to step S925. If NOT, process S900 proceeds to the decision step S930. In step S925, process S900 feeds back an adjustment indicator to the InfoEvaluator server for the document. The adjustment indicator informs the Information Evaluator to adjust its parameters such that the information value is computed in the direction to satisfy the constraints. In the decision step S930, it is determined if the folder is a sub-folder of a SmartFolder. If YES, process S900 proceeds to step S935. If NO, process S900 proceeds to step S940. In step S935, the document is rejected from the parent folder. Then process S900 proceeds to step S940. In step S940 the document is removed from the folder.

The SmartFolder Intelligent Filing System described in the present invention automatically organizes documents based on their contents and the usage profiles. The system eliminates the tedious process of document searching. In addition, the system also learns the usage profile of the user to categorize the documents according to the user's current interests or organizational methods.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for automatically organizing information into a plurality of storage elements comprising steps of:
   (a) generating a profile and a constraint expression associated with one of said plurality of storage elements;
   (b) recognizing a feature corresponding to said profile contained in the information;
   (c) evaluating said feature to produce an information expression;
   (d) determining if said information expression matches said constraint expression; and
   (e) storing said information in said one of said plurality of storage elements if said information expression matches said constraint expression.

2. The method of claim 1 wherein the step of generating a profile and a constraint expression includes a step of categorizing in an interactive dialog session.

3. The method of claim 1 wherein the step of generating a profile and a constraint expression creates an initial file.

4. The method of claim 1 wherein the step of recognizing a feature contained in the information includes a step of scanning the information to extract said feature.

5. The method of claim 1 wherein the step of evaluating said feature includes a step of determining an information value by using an information evaluator.

6. The method of claim 5 further comprises a step of updating said information evaluator.

7. The method of claim 6 wherein the step of updating includes a step of submitting the information.

8. The method of claim 7 wherein the step of updating includes a step of rejecting the information.

9. The method of claim 7 wherein the step of submitting the information adjusts the information evaluator until said information expression matches said constraint expression.

10. The method of claim 8 wherein the step of rejecting the information adjusts the information evaluator until said information expression does not match said constraint expression.

11. A system for automatically organizing information into a plurality of storage elements in a processor-based system comprising:
    a memory for storing instruction sequences by which the processor-based system is processed, the memory including a plurality of storage elements; and
    a processor coupled to said memory for executing the stored instruction sequences, said instruction sequence including process steps that cause the processor to:
    (a) generate a profile and a constraint expression associated with one of said plurality of storage elements,
    (b) recognize a feature corresponding to said profile contained in the information,
    (c) evaluate said feature to produce an information expression,
    (d) determine if said information expression matches said constraint expression, and
    (e) store said information in said one of said plurality of storage elements if said information expression matches said constraint expression.

12. The system of claim 11 wherein the information is scanned to extract said feature.

13. The system of claim 11 wherein said feature is evaluated by a constraint evaluator using an information evaluator.

14. The system of claim 13 wherein said information evaluator is adjusted until said information expression matches said constraint expression.

15. The system of claim 13 wherein information evaluator is adjusted until said information expression does not match said constraint expression.

* * * * *